United States Patent [19]

Luecke

[11] Patent Number: 5,029,030
[45] Date of Patent: Jul. 2, 1991

[54] ROTARY ACTUATOR SYSTEM WITH ZERO SKEW ANGLE VARIATION

[75] Inventor: Francis S. Luecke, San Jose, Calif.
[73] Assignee: International Business Machines Corporation, Armonk, N.Y.
[21] Appl. No.: 481,843
[22] Filed: Feb. 20, 1990
[51] Int. Cl.⁵ .................... G11B 5/55; F16H 27/02
[52] U.S. Cl. ........................ 360/106; 74/89.22
[58] Field of Search ............................ 360/106

[56] References Cited
U.S. PATENT DOCUMENTS

| | | | |
|---|---|---|---|
| 4,811,144 | 3/1989 | Miller et al. | 360/106 |
| 4,891,722 | 1/1990 | Ekhoff | 360/106 |

Primary Examiner—John H. Wolff
Assistant Examiner—Jefferson Evans
Attorney, Agent, or Firm—Douglas R. Millett

[57] ABSTRACT

A transducer head is located on a head arm. The head arm has a roller surface which contacts a fixed surface at a point of contact. The roller surface is attached to the fixed surface such that the roller surface may roll along the fixed surface without slipping. The roller surface and the fixed surface are such that a line between the point of contact and a disk center is always perpendicular to a line between the disk center and the transducer head for all positions as the roller surface rolls along the fixed surface.

40 Claims, 3 Drawing Sheets

ROTARY ACTUATOR SYSTEM WITH ZERO SKEW ANGLE VARIATION

TECHNICAL FIELD

1. Background of the Invention

This invention relates to a data storage disk drive and more particularly to a rotary actuator for a read/write head.

2. Description of the Prior Art

In disk drive technology it is becoming increasingly important that the relative angle between the read/write or transducer head and the data tracks change very little, if at all, as the head moves across the surface of the disk. The relative angle between the head and the tracks is also known as skew. Magnetic recording disks can now achieve very large track densities and even a small change in the head skew can interfere with proper reading and writing of data on the disk. In optical disk drive systems, array heads are now being used. These heads focus two or more laser spots onto a single track at the same time. Any large variation in the skew of the head will make it impossible to align both laser spots on the same track.

Currently, head actuators consist of three types: linear, rotary, and combinations of both. Linear actuators consist of a sliding arm to which the head is attached. The arm is aligned along a radius of the disk and the head moves along the radius as the arm slides in and out without any variation in the skew. The problem with linear actuators is that they require a number of roller bearings to hold the arm. These bearings add unwanted inertia and frictional force to the system.

The use of linear actuators in optical systems causes additional problems. Generally, in an optical system a lens and a mirror are located at the head of the actuator arm and the rest of the optical system is located at a fixed location. The lens and mirror move relative to the rest of the fixed optical system which can make proper alignment of the system very difficult. One way to solve this alignment problem is to locate all of the optical system at the head. However, the relatively large amount of mass at the end of the actuator arm greatly reduces its speed, and hence, increases the access time of the disk drive system. U.S. Pat. No. 4,161,004 issued July 10, 1979 to Dalziel, et al. illustrates a typical linear actuator system.

Rotary actuators pivot about a point or roll about a surface. The advantage of a rotary actuator is that it is much lighter and faster than the linear actuator. Rotary actuators are especially applicable to optical disk drive systems because the lens and mirror can be located at the head while the rest of the optical system can be positioned on the arm near the pivot point. Since the optical system parts are now fixed relative to one another, the alignment is not a problem. Also, the addition to the inertia of the arm is very small when the bulk of the optical system is located near the pivot point. Thus, the access time can still be quite fast.

The major problem with the rotary actuator is that the skew angle between the head and the data tracks can vary by as much as 10 to 15 degrees as the head moves across the disk. Optimizing the position of the head and the dimensions of the head arm can reduce the skew angle variance, however, the variance may still be too large for high density magnetic or optical disk drive systems.

U.S. Pat. No. 4,751,597 issued June 14, 1988 to Anderson; U.S. Pat. No. 4,200,894 issued Apr. 29, 1980 to Kaseta, et al.; U.S. Pat. No. 3,500,363 issued Mar. 10, 1970 to Shill; and U.S. Pat. No. 4,794,586 issued Dec. 27, 1988 to Korth all illustrate typical rotary actuator systems.

U.S. Pat. No. 4,556,924 issued Dec. 3, 1985 to Quist, Jr., et al. and U.S. Pat. No. 4,775,907 issued Oct. 4, 1988 to Shtipelman disclose rotary actuators which have heads which compensate for the skew angle variance. However, both of these devices require a relatively large number of additional parts which correspondingly slows the access time.

SUMMARY OF THE INVENTION

In accordance with the present invention, a rotary actuator system comprises a data storage disk, a fixed surface, an arm to which a head is connected and means to attach the arm to the fixed surface. The arm has a roller surface which contacts the fixed surface at a point of contact. The attachment means allows the roller surface of the arm to roll without sliding along the fixed surface. The fixed surface and the roller surface are such that a line between the point of contact and the disk center is always perpendicular to a line between the disk center and the read/write head for all positions as the roller surface rolls along the fixed surface. The result is that a zero skew angle is established between the data tracks on the disk and the head which does not vary as the actuator moves the head across the data tracks.

For a fuller understanding of the nature and advantages of the present invention reference should be made t the following detailed description taken in conjunction with the accompanying drawings.

DESCRIPTION OF THE PREFERRED EMBODIMENTS

Figure 1:
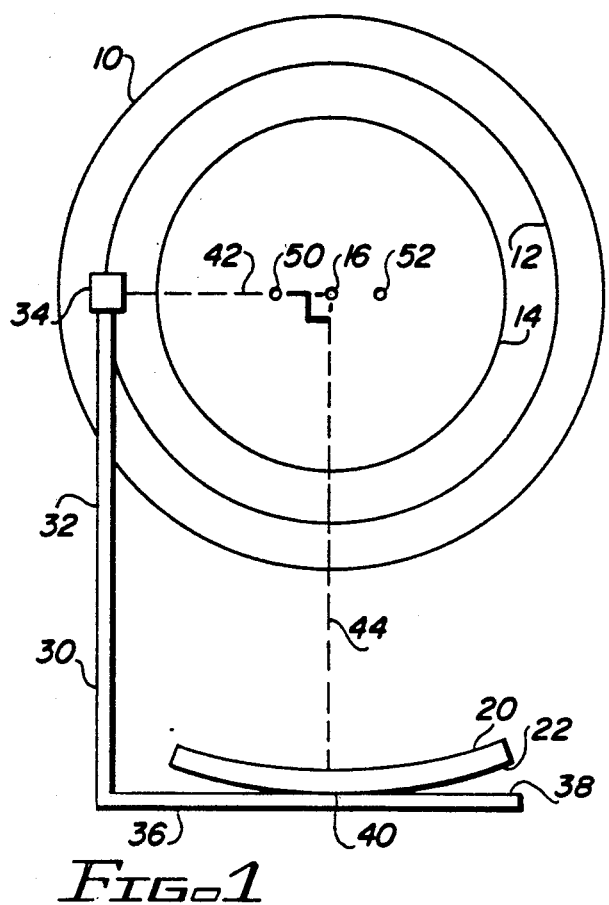
FIG. 1 shows a first embodiment of the rotary actuator system according to the present invention.

FIG. 1 shows a first embodiment of the rotary actuator system of the present invention. The system has a data storage disk 10 which has an outer data track 12 and an inner data track 14. Disk 10 may be either a magnetic or optical storage disk. Disk 10 rotates about a fixed position spindle axis 16 located at the center of disk 10. A fixed member 20 is shown located a distance beyond the outer edge of disk 10. Fixed member 20 may also be located within the outer edge of disk 10. Member 20 has a fixed surface 22 which is a cylindrical arc centered about axis 16. The cylindrical arc of surface 22 is concentric with the disk 10.

An actuator arm 30 has a head section 32 which contains a transducer head 34 attached to a first end. Head 34 is positioned over disk 10 and may be either a magnetic or optical transducer head. Head section 32 is attached to a roller member 36. Roller member 36 has a roller surface 38 which lies in a plane perpendicular to disk 10. The longitudinal axis of the head section 32 is perpendicular to roller surface 38. Roller surface 38 abuts fixed surface 22 along a point of contact 40 which is perpendicular to disk 10. (Point of contact 40 is actually a line of contact which appears as a point when seen from a top view. Thus, for simplicity, all lines of contact will be referred to as points of contact.) An attachment means, which will be shown in more detail below, attaches roller member 36 to fixed member 20 such that roller surface 38 rolls along fixed surface 22 without slipping. Head 34 is positioned along arm 30 such that a line 42 from the active portion of head 34 to axis 16 is perpendicular to a line 44 from axis 16 to line of contact 40. In other words, a radius of disk 10 through the point of contact 40 is always perpendicular to a radius of disk 10 through the head 34.

The operation of the present invention may now be understood. As head 34 moves inward or outward from disk 10, the roller surface 38 rolls along the fixed surface 22. The line of contact 40 will correspondingly shift along the arc of fixed surface 22. For any position, the line 42 (between head 34 and axis 16) will always be perpendicular to line 44 (the line between axis 16 and line of contact 40). The result is that head 34 will always have the same skew angle relative to axis 16 and to the data tracks.

Another way to visualize this is to imagine disk 10 moving relative to head 34 instead of the other way around. Suppose head 34 and its arm 30 are fixed. Now suppose that disk 10 is enlarged such that its outer circumference lies along surface 22. If disk 10 is allowed to roll along the surface 38, it can be seen that the center of the disk 10 will always lie along line 42. If disk 10 rolls to the left, the center axis moves to a point 50. If disk 10 rolls to the right, the center axis moves to a point 52. In either case, the skew angle between the head 34 and the data tracks does not change. From the perspective of the head 34 the center of the disk moves along a straight line relative to it.

Of course, in actuality the head 34 moves and the disk axis 16 remains fixed. From the perspective of the fixed axis 16, the head 34 will appear to move along an arc. However, for any position of head 34, the lines 42 and 44 remain perpendicular and the skew angle does not change.

In addition to plane surface 38 and circular arc 22, there are a number of other complementary surface pairs which may be used in the present invention. Again, it is best to visualize the head a being fixed and the disk rolling relative to the head. As long as the center of the disk moves along a straight line relative to the fixed head, then the surfaces are complementary and may be used in the present invention.

If the curve of the head arm surface is described by:

Y=f(x)

then the mating surface is characterized by:

$$R = f(x); \theta = \int \frac{dx}{f(x)}$$

Figure 2:
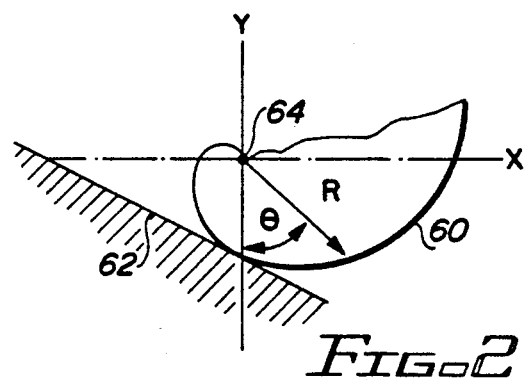
FIG. 2 shows a pair of complementary surfaces according to the present invention.

FIG. 2 shows a complementary pair of surfaces (a logarithmic spiral 60 and a tilted plane 62). The spiral is described by:

$$R = ax + b; \theta = \frac{1}{a} \ln(ax + b)$$

As the spiral 60 rolls along plane 62, a center point 64 will always move along a straight line along or parallel to the x axis. To adapt these surfaces to the present invention, the spiral surface 60 is substituted for surface 22 such that point 64 is located at axis 16. The tilted plane 62 is then substituted for surface 38 and the position of head 34 is adjusted such that lines 42 and 44 are perpendicular.

Figure 3:
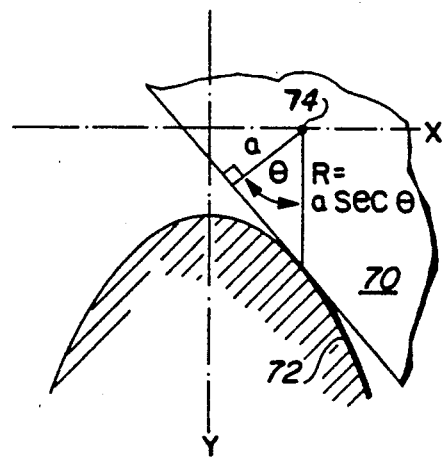
FIG. 3 shows a pair of complementary surfaces according to the present invention.

FIG. 3 shows another complementary pair of surfaces. A square wheel 70 rolls along a catenary surface 72.

$$x = a \ln \tan \left( \frac{\theta}{2} + \frac{\pi}{4} \right); y = a \sec\theta$$

As the square wheel 70 rolls along surface 72, a point 74 moves along the x axis. To adapt these surfaces to the present invention, the flat surface wheel 70 is substituted for surface 22 with point 74 located at axis 16. The catenary surface 72 is then substituted for surface 38 and the position of head 34 is adjusted such that lines 42 and 44 are perpendicular.

Figure 4:
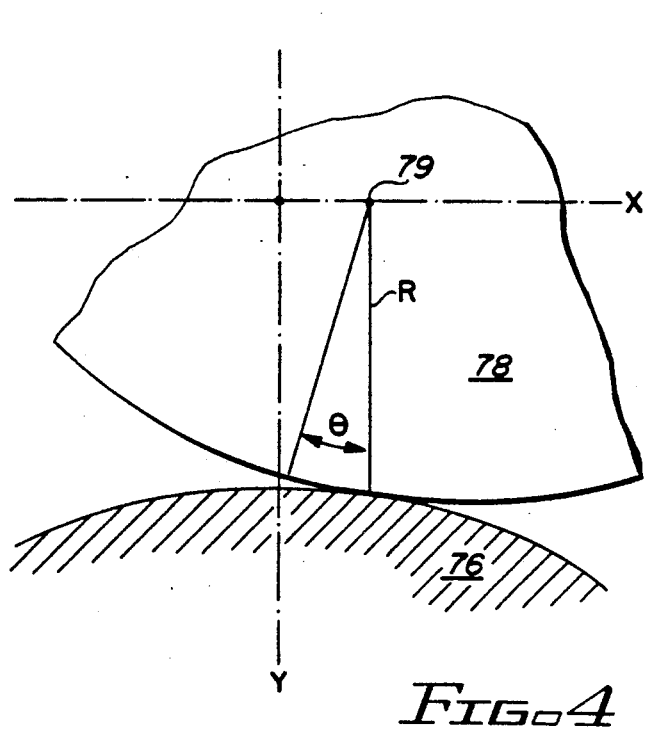
FIG. 4 shows a pair of complementary surfaces according to the present invention.

FIG. 4 shows two congruent parabolic curves which may be used in the present invention. A parabolic fixed surface 76 is defined as:

$$Y = 1 + \frac{x^2}{4}$$

A parabolic wheel is defined as:

$$R = \frac{2}{1 + \cos\theta}$$

Wheel 78 has a center point 79. The wheel 78 may be substituted for surface 22 with point 79 located at axis 16. The surface 76 may be substituted for surface 38 and the position of head 34 adjusted such that lines 42 and 44 are perpendicular.

Additional complementary surfaces are shown in the article "Rockers and Rollers" by Gerson B. Robison, Mathematics Magazine, January 1960, pp. 139-144.

Figure 5:
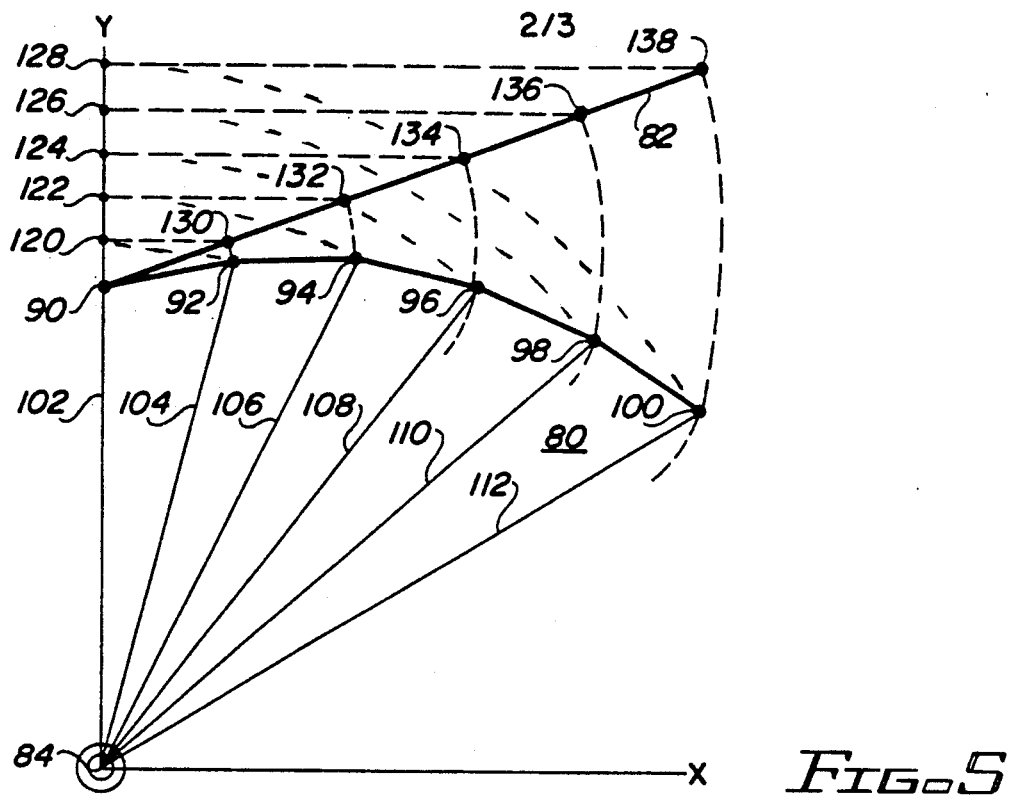
FIG. 5 shows a pair of complementary surfaces according to the present invention.

FIG. 5 graphically shows a way to approximate complementary surfaces. A wheel 80 with its center initially at a point 84 at the origin moves along the X axis. The periphery of wheel 80 is initially in contact with a surface 82 at a point 90. A plurality of points 92-100 are located on the periphery of wheel 80 and the line segments between each pair of points define the outer surface of the wheel 80. A plurality of lines 102-112 represent the radii between point 84 and points 90-100, respectively. A plurality of points 120-128 represent the positions of points 92-100, respectively on the Y axis if wheel 80 were rotated about point 84. A point 130 on surface 82 lies along a line horizontally projected from point 120. The line segment between points 90-92 is rotated about point 90 and the intersection of this rotation and the horizontal line from point 120 is point 130. To define a point 132 on surface 82 which corresponds to point 94 of wheel 80, a line is projected horizontally from point 122. A line segment equal to the distance between the points 92-94 is rotated about point 130. The intersection is the point 132. The procedure is repeated to find points 134, 136 and 138 which correspond to points 96, 98 and 100, respectively.

As wheel 80 rolls along surface 82, the point 84 will move along the X axis. The wheel 80 ma be substituted for surface 22 with point 84 located at axis 16. The surface 82 may be substituted for surface 38 and the position of head 34 adjusted such that lines 42 and 44 are perpendicular. Additional complementary surfaces may be derived in the same manner.

It has been shown that there are a number of complementary surfaces which may be used in the present invention. A further improvement of the actuator system of FIG. 1 would be to move arm 34 such that its longitudinal axis is closer to the center of rotation.

Figure 6:
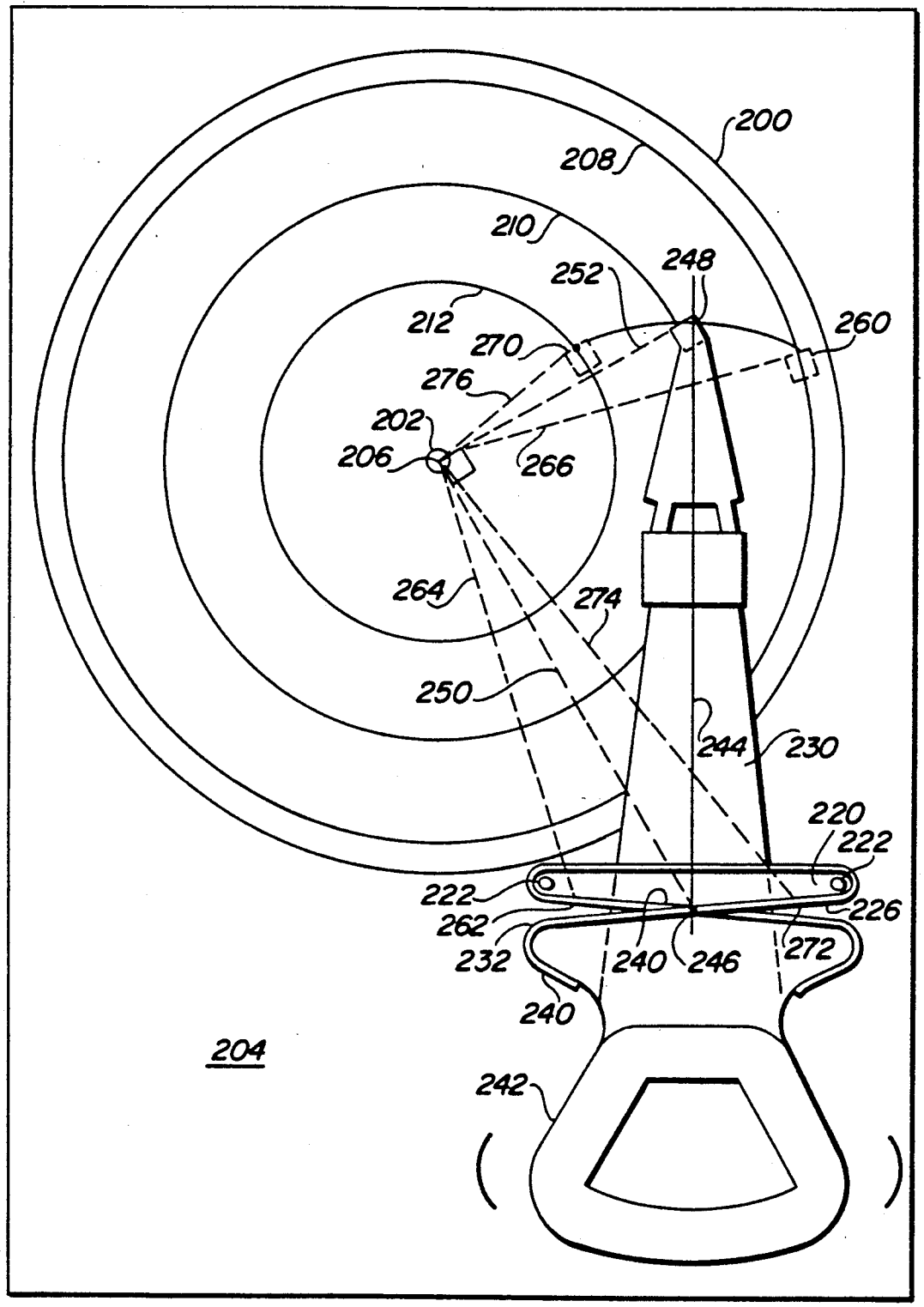
FIG. 6 shows a second embodiment of the rotary actuator system according to the present invention.

FIG. 6 shows a rotary actuator system of the present invention with an arm having a longitudinal axis close to the center of rotation. A data storage disk 200 rotates about a spindle 202. Spindle 202 is fixed relative to a disk drive body 204 and has a central spindle axis 206. Disk 200 may be a magnetic or optical disk. Disk 200 has an outer data track 208, a center data track 210 and an inner data track 212.

A fixed member 220 is attached to body 204 by a pair of posts 222. Member 220 has a curved fixed surface 226 which is perpendicular to the plane of disk 200. An arm 230 has a roller surface 232 which is in contact with fixed surface 226 of member 220. Arm 230 is attached to member 220 by a plurality of bands 240. Bands 240 allow roller surface 232 to rotate along fixed surface 226 without slipping.

Arm 230 has a voice coil motor or counter weight section 242. Arm 230 has a center line segment 244 which extends from the initial point of contact 246 between surfaces 226 and 232 to a head 248. A line 250 from point 246 to axis 206 is perpendicular to a line 252 from axis 206 to the active portion of a transducer or read/write head 248. Head 248 may be either a magnetic or optical head. As arm 230 rotates clockwise, head 248 moves to a position 260 and a point 262 becomes a point of contact between surface 226 and surface 232. A line 264 between point 262 and axis 206 is perpendicular to a line 266 between axis 206 and head 248. As head 248 moves to a position 270, a point 272 becomes a line of contact between surfaces 226 and 232. A line 274 between point 272 and axis 206 is perpendicular to a line 276 between axis 206 and head 248. The skew angle of head 248 does not vary as it moves across disk 200.

In this embodiment the roller surface 232 is a cylindrical arc having a radius approximately equal to twice the length of line segment 244. Fixed surface 226 is a complementary curved surface similar to wheel 60 in FIG. 2. The exact shape of surface 226 is derived by fitting a smooth curve through the points using the method shown in FIG. 5. However, it has been found that a cylindrical arc having the same radius as the cylindrical arc of surface 232 (a radius approximately equal to twice the length of line segment 244) is a close approximation to the ideal curve. This approximation does introduce a skew angle variance of less than 0.05 degrees.

Figures 7, 8, 9:
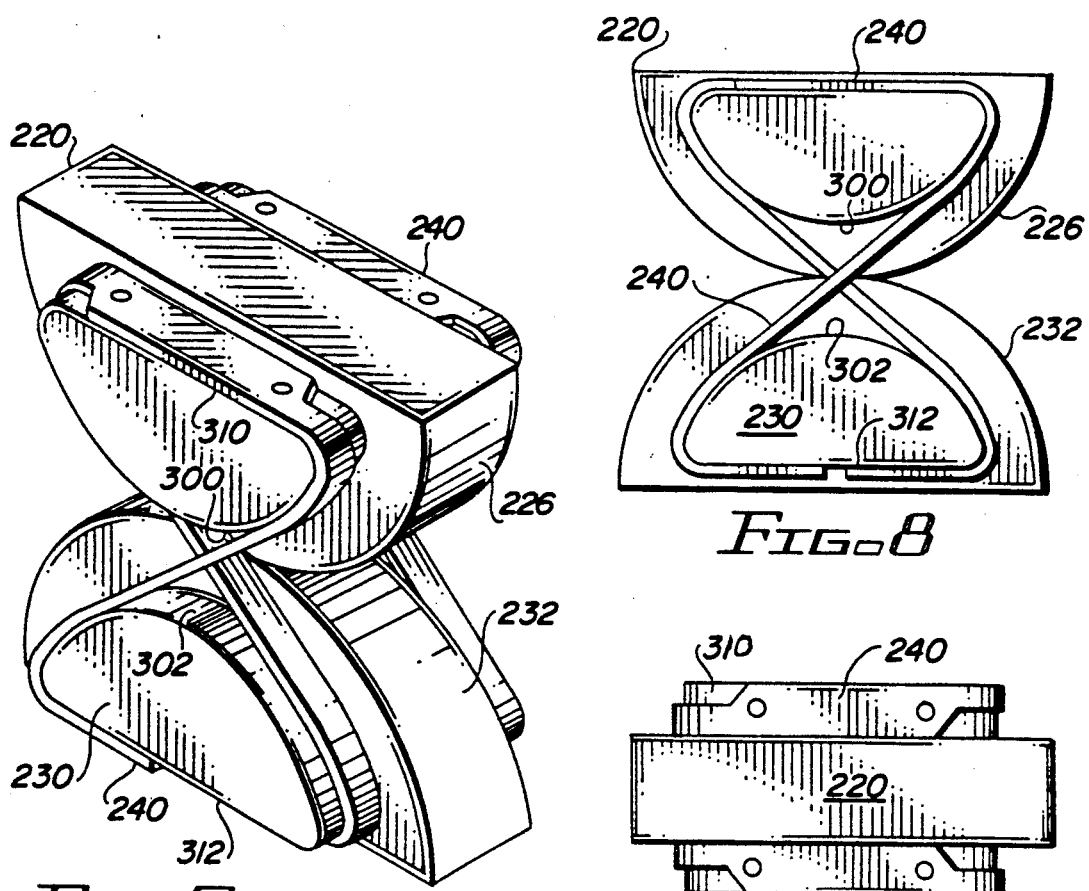
FIG. 7 shows an exaggerated perspective view of the attachment means.
FIG. 8 shows a top view of the attachment means of FIG. 7.
FIG. 9 shows a side view of the attachment means of FIG. 7.

FIGS. 7, 8 and 9 show a perspective, top and side view, respectively of the bands 240 joining member 220 and arm 230. The shapes of member 220 and arm 230 have been exaggerated to more clearly illustrate the operation of bands 240. Member 220 has an offset ledge 300 which is offset a distance form the edge of surface 226. Arm 230 has a similar ledge 302 which is offset a distance from the edge of surface 232. Bands 240 are wrapped in a figure eight pattern around ledges 300 and 302 and are secured to a pair of flat surfaces 310 and 312 behind surfaces 300 and 302, respectively.

The offset ledges 300 and 302 insure that bands 240 always have a directional force holding the arm 230 to member 220. If the bands 240 were attached directly to surfaces 226 and 232, then at the point of contact, the bands 240 would be tangential to surfaces 226 and 232 and there would be no force in a direction perpendicular to the surfaces which would hold the surfaces together.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A rotary actuator system comprising:
   a data storage disk having a plurality of concentric data tracks and having a fixed position central axis;
   a nonrotating nonconcave fixed surface connected to said central axis, said fixed surface being substantially perpendicular to a plane containing said concentric data tracks of said disk;
   a transducer head;
   a head member for mounting the head, the head member having a roller surface, said roller surface attached to said fixed surface by attachment means which allow said roller surface to roll along said fixed surface without slipping, said fixed surface and said roller surface having complimentary shapes and being positioned such that a line from a point of contact between said fixed surface and said roller surface and said central axis is always approximately perpendicular to a line from said central axis to said head.

2. The system of claim 1 wherein said attachment means comprises a first band section connected between said fixed surface and said roller surface, and a second band section connected between said fixed surface and said roller surface, said first and second band sections crossing over each other.

3. The system of claim 2 wherein said fixed surface has a fixed band surface offset a distance from said fixed surface and said head member has a roller band surface offset a distance from said roller surface, portions of said first and second band sections being wrapped around said fixed band surface and said roller band surface.

4. The system of claim 1 wherein said fixed surface and said roller surface are located beyond an outer edge of said disk.

5. The system of claim 1 wherein said fixed surface is a cylindrical arc and said roller surface is a flat surface.

6. The system of claim 1 wherein said fixed surface is a spiral surface and said roller surface is a flat surface.

7. The system of claim 1 wherein said fixed surface is a flat surface and said roller surface is a catenary surface.

8. The system of claim 1 wherein said fixed surface is a first parabolic surface and said roller surface is a second parabolic surface.

9. The system of claim 1 wherein said fixed surface is a spiral surface and said roller surface is a cylindrical arc.

10. The system of claim 1 wherein said fixed surface is a first cylindrical arc and said roller surface is a second cylindrical arc where the radii of said first and second cylindrical arcs are equal.

11. A rotary actuator system comprising:
    a data storage disk having a plurality of concentric data tracks and having a central axis;
    a nonrotating nonconcave fixed surface connected to said central axis, said fixed surface being substantially perpendicular to a plane containing said concentric data tracks of said disk;
    a transducer head;
    a head member for mounting said head, said head member having a roller surface in contact with said fixed surface, said head member attached to said fixed surface by attachment means which allow said roller surface and said fixed surface to roll without slipping relative to each other, said fixed surface and said roller surface having complimentary shapes and being positioned such that as said fixed surface and said roller surface roll relative to each other, said central axis moves in an approximately straight line from the perspective of the head.

12. The system of claim 11 wherein said attachment means comprises a first band section connected between said fixed surface and said roller surface, and a second band section connected between said fixed surface and said roller surface, said first and second band sections crossing over each other.

13. The system of claim 12 wherein said fixed surface has a fixed band surface offset a distance from said fixed surface and said head member has a roller band surface offset a distance from said roller surface, portions of said first and second band sections being wrapped around said fixed band surface and said roller band surface.

14. The system of claim 11 wherein said fixed surface and said roller surface are located beyond an outer edge of said disk.

15. The system of claim 11 wherein said fixed surface is a cylindrical arc and said roller surface is a flat surface.

16. The system of claim 11 wherein said fixed surface is a spiral surface and said roller surface is a flat surface.

17. The system of claim 11 wherein said fixed surface is a flat surface and said roller surface is a catenary surface.

18. The system of claim 11 wherein said fixed surface is a first parabolic surface and said roller surface is a second parabolic surface.

19. The system of claim 11 wherein said fixed surface is a spiral surface and said roller surface is a cylindrical arc.

20. The system of claim 11 wherein said fixed surface is a first cylindrical arc and said roller surface is a second cylindrical arc where the radii of said first and second cylindrical arcs are equal.

21. A rotary actuator system for use in moving a head relative to a rotatable disk in a disk drive, the actuator comprising:
    a mounting member having a nonrotating nonconcave fixed surface;
    head transport means for moving the head, the head transport means having head attachment means for mounting the head, and said head transport means having a roller surface;
    attachment means for attaching the head transport means to the mounting member such that said roller surface rolls along said fixed surface without slipping, said fixed surface and said roller surface are shaped and positioned such that a line from a point of contact between said fixed surface and said roller surface and a central axis of the disk is always approximately perpendicular to a line from said central axis to the head.

22. The system of claim 21 wherein said attachment means comprises a first band section connected between said fixed surface and said roller surface, and a second band section connected between said fixed surface and said roller surface, said first and second bands sections crossing over each other.

23. The system of claim 22 wherein said fixed surface has a fixed band surface offset a distance from said fixed surface and said roller surface has a roller band surface offset a distance from said roller surface, portions of said first and second band sections being wrapped around fixed band surface and said roller band surface.

24. The system of claim 21 wherein said fixed surface and said roller surface are located beyond an outer edge of said disk.

25. The system of claim 21 wherein said fixed surface is a cylindrical arc and said roller surface is a flat surface.

26. The system of claim 21 wherein said fixed surface is a spiral surface and said roller surface is a flat surface.

27. The system of claim 21 wherein said fixed surface is a flat surface and said roller surface is a catenary surface.

28. The system of claim 21 wherein said fixed surface is a first parabolic surface and said roller surface is a second parabolic surface.

29. The system of claim 21 wherein said fixed surface is a spiral surface and said roller surface is a cylindrical arc.

30. The system of claim 21 wherein said fixed surface is a first cylindrical arc and said roller surface is second cylindrical arc where the radii of said first and second cylindrical arcs are equal.

31. A rotary actuator system for use in moving a head relative to a rotatable disk in a disk drive, the actuator comprising:
    a mounting member having a nonrotating nonconcave fixed surface;
    head transport means for moving the head, the head transport means having head attachment means for mounting the head, and the head transport means having a roller surface; and
    attachment means for attaching the head transport means to the mounting member such that said roller surface rolls along said fixed surface without slipping, said fixed surface and said roller surface are shaped and positioned such that as the fixed surface and the roller surface roll relative to each other, a central axis of the disk moves in an approximately straight line from the perspective of the head.

32. The system of claim 31 wherein said attachment means comprises a first band section connected between said fixed surface and said roller surface, and a second band section connected between said fixed surface and said roller surface, said first and second band sections crossing over each other.

33. The system of claim 32 wherein said fixed surface has a fixed band surface offset a distance from said fixed surface and said roller surface has a roller band surface offset a distance from said roller surface, portions of said first and second band sections being wrapped around said fixed band surface and said roller band surface.

34. The system of claim 31 wherein said fixed surface and said roller surface are located beyond an outer edge of said disk.

35. The system of claim 31 wherein said fixed surface is a cylindrical arc and said roller surface is a flat surface.

36. The system of claim 31 wherein said fixed surface is a spiral surface and said roller surface is a flat surface.

37. The system of claim 31 wherein said fixed surface is a flat surface and said roller surface is a catenary surface.

38. The system of claim 31 wherein said fixed surface is a first parabolic surface and said roller surface is a second parabolic surface.

39. The system of claim 31 wherein said fixed surface is a spiral surface and said roller surface is a cylindrical arc.

40. The system of claim 31 wherein said fixed surface is a first cylindrical arc and said roller surface is a second cylindrical arc where the radii of said first and second cylindrical arcs are equal.

* * * * *